July 29, 1969  M. B. EATON  3,457,868

CENTRIFUGAL PUMPS

Filed Sept. 8, 1967

Inventor:
Maurice Barry Eaton

Attorneys:
Newton, Palmer, Stewart & Estabrook

United States Patent Office 3,457,868
Patented July 29, 1969

3,457,868
CENTRIFUGAL PUMPS
Maurice B. Eaton, Birmingham, England, assignor to Gainsborough Precision Engineering (Birmingham) Limited, Birmingham, England, a British company
Filed Sept. 8, 1967, Ser. No. 666,329
Int. Cl. F04d 15/00, 29/42
U.S. Cl. 103—97    6 Claims

ABSTRACT OF THE DISCLOSURE

In a centrifugal pump the pump casing is formed in two separate parts of which one part incorporates a manually operable valve which can be closed to prevent liquid entering the pump thereby permitting removal of the other part together with the pump proper substantially without leakage of liquid.

SPECIFIC DESCRIPTION

This invention relates to pumps and more particularly although not exclusively to centrifugal pumps of the kind in which the pump impeller is driven by the rotor of an electrical motor installed within the casing of the pump.

According to our invention the flow of liquid normally entering a pump from an inlet is controlled by a manually operable valve which is movable between an open position in which there is a maximum flow into the pump and a closed position in which the flow into the pump is cut off whereby parts of a casing of the pump can be separated for removal and replacement of the pump substantially without external leakage of liquid.

Figure 1:
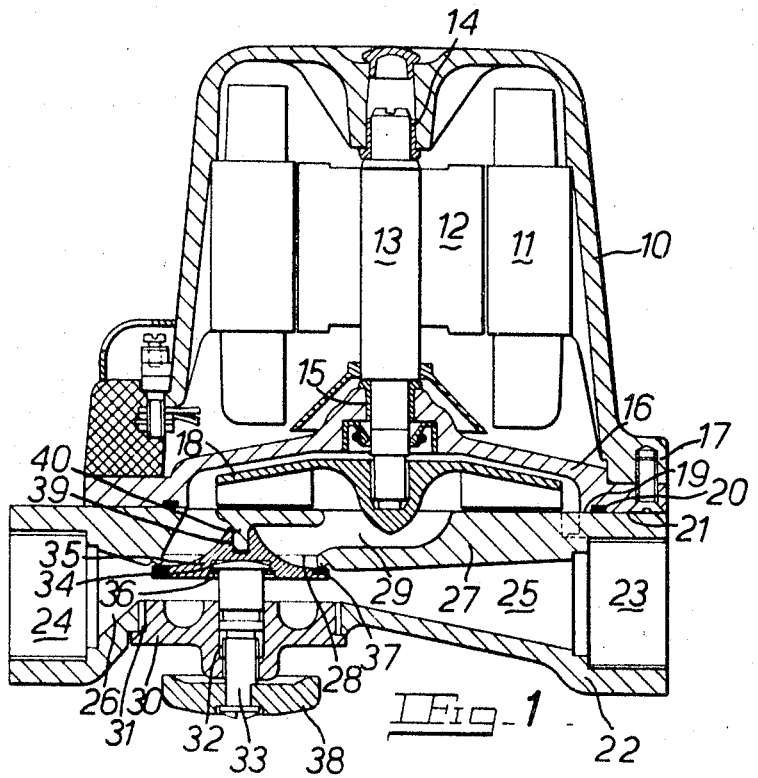
Figure 2:
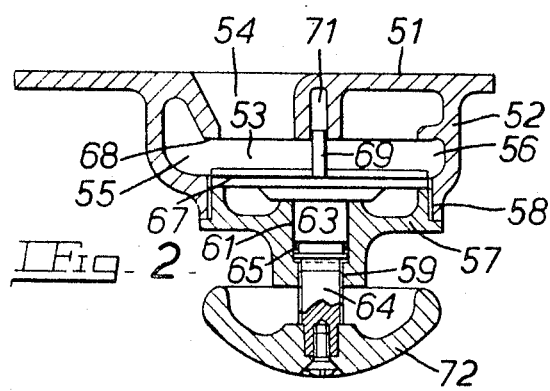

One embodiment of our invention is illustrated in the accompanying drawings in which:

FIGURE 1 is a section through a centrifugal pump and the manually operable control valve; and FIGURE 2 is a section showing a modified control valve.

In the construction shown in FIGURE 1, one part 10 of the pump casing is formed as a cup-shaped shell closed at its outer end in which is installed the stator 11 and rotor 12 of electric motor. A shaft 13 mounted on the rotor 12 is rotatably mounted at its outer end in a bearing 14 in the closed end of the shell and at its inner end the shaft 13 projects through and is rotatable in a bearing 15 housed in an annular member 16 secured to the rim 17 of the shell. An impeller 18 is mounted on the end of the shaft which projects from the side of the annular member 16 remote from the rotor 12.

The outer face of the annular member 16 is provided with an annular portion 19 which extends radially inwards from the periphery of the member and in which is located an annular sealing ring 20. The annular portion 19 is adapted to seat against a cooperating annular portion 21 on a housing 22 forming another part of the pump casing to which it is secured by any convenient and readily releasable means (not shown), such as nuts and bolts, and the two cooperating parts are sealed by the annular sealing ring 20.

The housing 22 at diametrically opposite points is provided with unions or connections 23, 24 by which it can be connected in a pipeline forming, for example, a part of a central heating system. The unions or connections 23, 24 lead, respectively, into inlet and outlet passages 25, 26 which, in the inner side 27 of the housing 22 adjacent to the annular member, terminate in an opening 28 which communicate with a chamber 29 formed between this part of the casing and the impeller.

A plug 30 is screw threaded and fluid sealed engagement in an opening 31 in the outer side of the housing 22 opposite the opening 28 in the inner side has a central bore 32 in which is in screw threaded and in sealing engagement a valve stem 33. The inner end of the stem 33 is received in a recess 34 in a valve member 35 in which it is retained by a retaining ring 36 and the valve member 35 is adapted to cooperate with a seating 37 around the opening 28 in the inner side. At its outer end the stem 33 is provided with a knob or wheel 38 by operation of which the stem can be rotated to move the valve member 35 towards or away from its seating 37. Rotation of the valve member 35 relative to its seating is prevented by the engagement of a T-shaped slot 39 in the valve member with a complementary spigot portion 40 on the casing.

When the pump is installed in a pipeline of central heating system with the connections connected in the pipeline, and the valve is open, with the pump operating the impeller 18 draws liquid through the inlet passage 25 and expels it from the outlet passage 26. At the same time liquid may be circulated, between the stator 11 and the rotor 12 in a known manner for cooling purposes.

The flow through the pump may be regulated as required by adjusting the position of the valve and when the pump is not operating the valve member 35 can be moved into engagement with the seating 37 so that full thermal flow can take place between the inlet and outlet passages 25, 26.

When the valve is in this closed position no liquid can enter the pump itself, and by releasing the retaining means the part 10 of the casing containing the pump proper, that is the rotor 12, stator 11 and impeller 18 can be removed from the housing 22 containing at least part volutes connected to the inlet and outlet passages, for pump maintenance, replacement and renewal.

This is very advantageous as this operation can be carried out simple and without the necessity of dismantling the system in any other way, and the central heating system can still be used during the period in which the pump proper has been removed i.e. under full thermal flow conditions.

In a modification the spigot portion may be provided on the valve member for engagement in a T-shaped slot in the casing. As shown in FIGURE 2 a part of a pump casing containing the pump proper is adapted to be detachably connected in sealing engagement with at least an annular portion of a face 51 of a casing 52. A chamber 53 in the casing 52 communicates through a passage 54 with a chamber in an adjacent face of the pump casing in which the pump impeller is located, and the chamber at diametrically opposed positions 55, 56 leads into inlet and outlet means or connection (not shown) by which it can be connected in a pipeline forming, for example, a part of a central heating system.

A plug 57 in screw-threaded and fluid-sealed engagement in an opening 58 in the side of the casing remote from the face 51 has a central bore 59 which, at its inner end, leads into a counterbore 61. A valve stem extending through the bore 59 and the counterbore 61 is formed in two separate parts 63 and 64 of which the inner part 63 of greater diameter than the outer part 64 is slightly received in the counterbore. A sealing ring 65 housed in an annular recess in the inner part provided a seal between that part and the counterbore.

A valve member 67 mounted on or integral with the inner end of the inner part 63 is movable from an open position shown in the drawing into a closed position in which it engages with an annular seating 68 in the housing to cut off communication between the chamber 53 and the passage 54. The valve member 67 has an inwardly projecting spigot 69 engaging in a T-shaped slot 71 in an adjacent face of the casing to prevent rotation of the valve member 67 relative to the seating 68.

The outer part 14 of the valve stem 62 is in screw threaded engagement with the bore 59 and at its outer end is provided with a knob or wheel 72 for rotating that part of the stem to move it axially in the bore 59. At its inner end of the outer part 63 is coupled to the outer end of the inner part by means permitting rotational axial movement of the outer part of 64, 63 with axial movement only of the inner part 63.

The operation of this modification is otherwise the same as the embodiment described above with reference to FIGURE 1 and need not be further described.

I claim:

1. A circulating pump comprising a casing, motor means in said casing, an impeller exterior of said casing adapted to be driven by said motor means, a housing having a chamber, means detachably securing said casing to said housing with said impeller communicating with said chamber, said housing incorporating an inlet passage and an outlet passage, and a third passage interconnecting said inlet and outlet passages, a single valve seating between said chamber and said third passage and defining sole inlet and outlet means therebetween, a single valve member located in said third passage, and externally operable means for moving said valve member axially between a fully open position in which it is spaced from said seating, and a closed position in which said valve member is in engagement with said seating, said valve member being so constructed and arranged that in said fully open position, upon rotation of said impeller, a maximum flow from said inlet passage is drawn into said chamber through said third passage and discharged from said chamber into said outlet passage through said third passage, and in said closed position communication between said chamber and said third passage is cut off to permit separation of said casing and said housing without external leakage of fluid.

2. A circulating pump as claimed in claim 1, wherein partition means located in said chamber provide separate inlet and outlet means between said third passage and said impeller.

3. The invention as claimed in claim 1, incorporating a stem having an outer end projecting from said housing and an inner end on which said valve member is carried, external means for rotating said stem relative to said housing to move said valve member between said open position and said closed position, and means for preventing rotation of said valve member relative to said seating.

4. The invention as claimed in claim 3, wherein said means for preventing rotation of said valve member comprise a tongue and slot engagement between said valve member and said housing.

5. The invention as claimed in claim 3, wherein said housing is provided with a spigot slidably engaging in a T-shaped slot in said valve member, and the inner end of said stem is coupled to said valve member by means permitting rotation of said stem relative to said valve member, and wherein a plug in sealed engagement in an opening in a wall of the housing remote from said shell is provided with a threaded bore in which said stem is in screw-threaded engagement, and a wheel for rotating said stem is mounted on said outer end of said stem.

6. The invention as claimed in claim 3, wherein said valve member is provided with a spigot slidably engaging in a T-shaped slot in said housing, and a plug in sealed engagement in a wall of the housing remote from said shell has a through-bore counterbored at its inner end, and wherein said stem is formed by aligned first and second parts, means coupling adjacent ends of said stem parts for relative rotation thereof, a slidable sealing engagement between said first stem part and said counterbore in said plug, a screw-threaded engagement between said bore in said plug and said second stem part, and a wheel for rotating said second stem part to effect movement of said valve member between said open position and said position carried by the outer end of said second stem part.

References Cited

UNITED STATES PATENTS 3,252,422   5/1966   Stulens _____ 103—97

FOREIGN PATENTS 443,246   2/1936   Great Britain.

ROBERT M. WALKER, Primary Examiner

U.S. Cl. X.R.
103—87, 228